United States Patent [19]

Corwin

[11] 4,163,738
[45] Aug. 7, 1979

[54] WASHABLE NON-SPLATTER INK
[75] Inventor: William C. Corwin, La Grange, Ill.
[73] Assignee: Beckman Instruments, Inc., Fullerton, Calif.
[21] Appl. No.: 886,363
[22] Filed: Mar. 14, 1978
[51] Int. Cl.$^2$ ............................................. C08L 33/24
[52] U.S. Cl. ..................... 260/29.6 ME; 260/45.7 R; 260/45.95 L; 260/29.6 H; 260/29.6 PM
[58] Field of Search ................. 106/22; 260/29.6 ME, 260/29.6 PM, 29.6 RW, 29.6 H, 33.2 R, 33.4 R, 45.7 R, 45.95 L

[56] References Cited
U.S. PATENT DOCUMENTS

| | | |
|---|---|---|
| 3,296,235 | 1/1967 | Zoebelein et al. ............... 260/29.6 H |
| 3,477,862 | 11/1969 | Forsyth, Jr. ............................ 106/22 |
| 3,692,548 | 9/1972 | Packer ..................................... 106/22 |
| 3,906,513 | 9/1975 | Siegelman et al. ..................... 106/22 |

*Primary Examiner*—J. Ziegler
*Attorney, Agent, or Firm*—Robert J. Steinmeyer; Paul R. Harder; Frank J. Kowalski

[57] ABSTRACT

A washable non-splatter ink for use in oscillographic type pen recorders is disclosed. The ink is characterized by being stable at room temperature for extended periods of time, thus not requiring refrigeration for the maintenance of stability. The ink contains a high molecular weight polyacrylamide rather than polyethylene oxide as a pituity agent to stop splatter of the ink at fast writing speeds. The polyacrylamide allows the use of washable acid dyes. The inclusion of an unsaturated alcohol, such as butyne diol acts to retard the oxidation of the pituity, thus stabilizing the pituity against aging degradation.

6 Claims, No Drawings

WASHABLE NON-SPLATTER INK

BACKGROUND OF THE INVENTION

The present invention relates to ink used in recording instruments and more particularly to non-splattering inks used in oscillographic type pen recorders and the like.

An inking system and ink therefore typical of the environment as wherein the present invention is applicable is set forth in the U.S. Pat. No. 3,906,513 to Siegelman et al. which is assigned to the common assignee of this application. In such apparatus, an oscillograph pen, comprising a metallic capillary tube connected to a supply of ink, is biased against a paper recording medium which is moved slowly and continuously under the pen tip. As the paper is thus moved under the pen tip, an electrical signal is applied to the oscillographic pen motor which drives the capillary tube type pen from side to side thus producing a permanent marking of the electrical waveform being applied at the input to the oscillograph. Such apparatus is prone to a number of problems. As the pen terminates its excursion in one direction toward the side of the recording paper and reverses direction to move in the opposite direction, the ink contained therein has a tendency to continue in the first direction as a result of the force of inertia on the ink. Additionally, as the pen tip is traversing the paper at a high rate of speed in response to a rapidly changing electrical signal of high frequency and amplitude, there is a tendency for the ink to discontinue marking on the surface of the paper for periods of time. The former problem is referred to as "splattering" and the latter as "skipping". Considerable research has been conducted by manufacturers of such oscillographic type pen recorders and their suppliers to find a workable solution to both the splattering and skipping problems. Unfortunately, the solutions often tend to be mutually exclusive. That is, a highly viscous ink would not tend to splatter but, on the other hand, would be highly prone to skipping. By contrast, a low viscosity ink that would not skip would have a high tendency to splatter.

In the aforementioned patent to Siegelman et al., as well as in the patents to Forsyth, Jr. (U.S. Pat. No. 3,477,862) and Packer (U.S. Pat. No. 3,692,548), a high molecular weight (about 500,000 to 5,000,000) polyethylene oxide is incorporated into the ink. The polyethylene oxide is one of certain polymers which, when in solution, exhibit the property of filament formation, or the tendency to pull out into long threadlike structures, as when a stirring rod is withdrawn from a container of the solution, for example. This ability to form filaments is believed to be a manifestation of the high elongational viscosity of polymer solutions. The tendency to form filaments is known as pituity. One way that pituity is measured is via a drop technique whereby a fixed quantity of solution is ejected from a microliter syringe. The time from when the drop of solution falls to a watch glass at a fixed distance below the syringe to when the thread of solution trailing from the watch glass to the top of the syringe breaks is taken as a measure of pituity.

The property of filament formation in an ink used in an oscillographic type recording system has two benefits. First, there is a tendency to reduce drag. This is because of the tendency of each particle of ink to pull the next adjacent particle through the capillary and for that ink on the surface to draw the next adjacent particle from the pen tip. The result is a tendency not to skip. At the same time, the filament formation tendency tends to prevent the disassociation of adjacent particles. It is the disassociation of adjacent particles which causes splattering. Thus, the inclusion of the polymer having the property of filament formation in the ink tends to solve both the skipping and splattering problems heretofore identified.

While the inclusion of high molecular weight polyethylene oxide into the ink has bestowed the desired benefits of non-splattering and nonskipping desired, it is not without attendant drawbacks. Under normal circumstances, other additives to the ink, including the dye thereof, have a tendency to oxidize the polyethylene oxide thus destroying its long chain molecules and attendant filament forming qualities. This is particularly noticeable with the sulfone groups of an acid dye. The presently known formulations of non-splatter ink incorporating polyethylene oxide require dyes with amine, $(-NH_2^+)$ or dimethyl amine, $[-N(CH_3)_2^+]$, groups or basic dyes such as basic violet 2, basic violet 3, or basic green 4, in order not to oxidize the polyethylene oxide. The basic dyes do not exhibit the tendency to rapidly oxide the polyethylene oxides as do the acid dyes. On the other hand, the basic dyes stain the users hands and the instrument badly while the acid dyes are water soluble and strain very little. Thus, to the user, ink incorporating acid dyes are preferred for cleanliness. Additionally, it is often desirable to have a single dye component black ink which is available only as an acid dye.

With the use of a pituity agent that is easily oxidizable, a washable ink that is stable at room temperature for more than approximately two months is not possible. The ink can be refrigerated to stop the deterioration process, but such refrigeration facilities are often not available at the sites wherein the recorders are desired to be incorporated.

Thus, it is the object of the present invention to provide a washable non-splatter ink incorporating a pituity agent which is not prone to oxidation when used in conjunction with acid dyes.

SUMMARY

The object of the present invention has been met by the ink of the present invention wherein a polyacrylamide pituity agent has been added in place of polyethylene oxide. In the preferred embodiment, polyacrylimide is used as a pituity agent along with an acid dye, a bacterial agent incorporated in a water based solvent, and 2-butyne-1,4-diol is used as an antioxidant.

DESCRIPTION OF THE PREFERRED EMBODIMENT

A typical batch of the preferred embodiment of the ink of the present invention is prepared as follows:

| Component | Quantity | Function |
|---|---|---|
| Water | 50 ml | Solvent (100 ml total) |
| Ethylene Glycol Methyl Ether | 4 ml | |
| Ethylene Glycol | 45 ml | |
| Glycerine | 1 ml | |
| Polyacrylamide | 10 mgm | Pituity Agent |
| Formaldehyde | 20 mgm | Antibacterial Agent Producing Preservative |
| 2-butyne-1,4-diol | 20 mgm | Antioxidant |
| Acid Black 2 | 7 gm | Dye |

In the ink according to the foregoing composition, the acid black 2 (or, alternatively, Nigrosine) dye is soluble to 0.12 grams of dye per milliliter of solvent in water, 0.07 grams per milliliter in ethylene glycol methyl ether, and 0.035 grams per milliliter in ethylene glycol. Water alone as a solvent has too high a surface tension and evaporates too quickly to make a good ink solvent. Ethylene glycol methyl ether and ethylene glycol are used to reduce the surface tension. Glycerine, ethylene glycol, Polyglycol 200 or a solvent with a very low vapor pressure and properties as a humectant is needed to prevent rapid clogging at the pen tip or in the polyvinyl chloride tube from the pen to ink bottle. The polyacrylamide, preferably Separan AP273 made by Dow Chemical Company, is used as a pituity agent to stop splatter of the ink at fast writing speeds. A formaldehyde producing preservative, preferably Dowacil 75 also made by Dow Chemical Company, is used to keep bacteria from consuming the pituity agent. An antioxidant 2-butyne-1,4-diol is also added to retard oxidation of the pituity agent. The result is an ink with a pituity of $2 \pm 1$ second, a viscosity of $10 \pm 5$ centipoise as measured with a Brookfield LVF Viscosimeter operating at 60 RPM with a No. 1 spindle, and a pH equal to $10 \pm 1$.

While the disclosed embodiment uses a black dye, this was chosen as being a "worst case". The polyacrylamide pituity agent should be useful in inks of other colors in addition to black. Likewise, the proportions of 10 mgm attributable to the polyacrylamide component of the ink can vary within tolerance limits of $\pm 50\%$ without adversely affecting the quality of the ink.

One should note when preparing ink according to the present invention that the polyacrylamide pituity agent employed more commonly functions as a floculant used in settling solid wastes suspended in water. Thus, in the ink mixing process it is important to have all dyes in solution before any floculant (pituity agent) is introduced. Such floculants are usually biodegradable so that a bacteriacide (such as the Dowacil 75 incorporated in the preferred embodiment) should be included if the pH is near neutral, which favors bacterial growth. Additionally, filament forming compounds such as polyacrylamide have a tendency to be destroyed by stirring. It has been found by the applicant that the preferred method of producing solutions of polyacrylamide for subsequent incorporation into the ink solution comprises sprinkling crystals of the material over shallow water such as in a cookie tin or the like, covering and letting the covered water set overnight. Any lumps can be taken out of the resultant solution by pouring through a small funnel. When the resultant solution is put into the ink, it should be done through a small funnel, about 4 millimeter, and the ink should be stirred slowly while the solutions are flowing together. The ink should then set for a day so that extruded cord of solution can diffuse out and mix with all the ink.

Having thus described my invention, I claim:

1. An ink for use in oscillographic pen recorders comprising:
   (a) a water based solvent;
   (b) about 10 mgm of polyacrylamide for every 100 ml of said solvent;
   (c) about 20 mgm of an antibacterial agent for every 100 ml of said solvent;
   (d) about 20 mgm of an antioxidant for every 100 ml of said solvent; and
   (e) about 7 gm of dye for every 100 ml of said solvent.

2. In washable ink for use in oscillographic pen recorders having a water base solvent, and an acid dye, the improvement for decreasing the splattering of the ink while increasing its non-refrigerated shelf life comprising:
   between 5-60 mgm of polyacrylamide added as a pituity agent for every 100 ml of the solvent.

3. The washable non-splatter ink as claimed in claim 2 and additionally comprising:
   approximately 20 mgm of a formaldehyde producing antibacterial agent for every 100 ml of the solvent.

4. The washable non-splatter ink as claimed in claim 2 wherein:
   said polyacrylamide is in an amount of about 10 mgm per 100 ml of said solvent.

5. A washable non-splatter ink particularly suited for use in oscillographic pen recorders comprising:
   (a) a water based solvent;
   (b) about 60 mgm of polyacrylamide pituity agent for every 100 ml of said solvent;
   (c) about 20 mgm of an antibacterial agent for every 100 ml of said solvent;
   (d) about 20 mgm of an antioxidant for every 100 ml of said solvent; and,
   (e) about 7 gm of dye for every 100 ml of said solvent.

6. The washable non-splatter ink as claimed in claim 5 wherein said water based solvent comprises:
   (a) about 50% water;
   (b) about 4% ethylene glycol methyl ether;
   (c) about 45% ethylene glycol; and,
   (d) about 1% glycerine.

* * * * *